(12) United States Patent
Brun

(10) Patent No.: US 11,798,696 B2
(45) Date of Patent: Oct. 24, 2023

(54) VESSEL ELECTRICAL PENETRATION ASSEMBLY FOR A NUCLEAR REACTOR

(71) Applicant: SOCIETE TECHNIQUE POUR L'ENERGIE ATOMIQUE, Villiers-le-Bâcle (FR)

(72) Inventor: Michel Brun, Simiane-Collongue (FR)

(73) Assignee: SOCIETE TECHNIQUE POUR L'ENERGIE ATOMIQUE, Villiers-le-Bâcle (FR)

( * ) Notice: Subject to any disclaimer, the term of this patent is extended or adjusted under 35 U.S.C. 154(b) by 187 days.

(21) Appl. No.: 17/089,139

(22) Filed: Nov. 4, 2020

(65) Prior Publication Data

US 2021/0210234 A1 Jul. 8, 2021

Related U.S. Application Data

(62) Division of application No. 15/777,561, filed as application No. PCT/EP2016/074704 on Oct. 14, 2016, now Pat. No. 10,861,609.

(30) Foreign Application Priority Data

Nov. 19, 2015 (FR) ...................................... 1561112

(51) Int. Cl.
*G21C 13/036* (2006.01)
*G21C 17/116* (2006.01)
(Continued)

(52) U.S. Cl.
CPC .......... *G21C 17/116* (2013.01); *G21C 13/036* (2013.01); *G21F 7/005* (2013.01); *H02G 3/22* (2013.01)

(58) Field of Classification Search
CPC ..... G21F 7/005; G21C 17/116; G21C 13/036; H02G 3/22; F16L 5/00; G01M 3/00; G01M 3/2853
See application file for complete search history.

(56) References Cited

U.S. PATENT DOCUMENTS 3,520,989 A * 7/1970 Matthews ............ G21C 17/116
174/151
3,780,204 A * 12/1973 Oliver .................. H01B 17/305
174/11 R
(Continued)

FOREIGN PATENT DOCUMENTS

DE 3037531 A1 5/1982
EP 1635099 A1 * 3/2006 ................ F16L 5/08
(Continued)

OTHER PUBLICATIONS

International Search Report as issued in International Patent Application No. PCT/EP2016/074704, dated Jan. 18, 2017.
(Continued)

*Primary Examiner* — Lily C Garner
(74) *Attorney, Agent, or Firm* — Pillsbury Winthrop Shaw Pittman LLP

(57) ABSTRACT

A vessel electrical penetration assembly for a feed-through of nuclear reactor vessel, the assembly including: a docking tube to form an extension of the secondary containment barrier of the reactor, the docking tube including: a first end to be positioned in the interior of the vessel and to be mechanically and sealably connected to an actuator in the interior of the vessel, and a second end to be mechanically and sealably secured to the vessel; a seal-tight electrical bar that passes through the docking tube and having on either side seal-tight connectors ensuring an electrical link between the actuator and the exterior of the reactor; the seal-tight electrical bar including a system for limiting a leakage of primary liquid to the exterior of the vessel if the secondary containment barrier extension fails; and a mechanical maintaining system for securing, under the required pressure conditions, the electrical bar to the vessel.

7 Claims, 3 Drawing Sheets

(51) Int. Cl.
  *G21F 7/005* (2006.01)
  *H02G 3/22* (2006.01)

(56) References Cited

U.S. PATENT DOCUMENTS

| | | | | |
|---|---|---|---|---|
| 3,801,722 A | * | 4/1974 | Korner | H01B 17/306 |
| | | | | 976/DIG. 240 |
| 3,806,167 A | * | 4/1974 | Notari | F16L 39/00 |
| | | | | 285/91 |
| 3,871,689 A | | 3/1975 | Zaderei | |
| 3,989,100 A | | 11/1976 | McDonald | |
| 4,107,456 A | | 8/1978 | Schuster | |
| 4,168,394 A | * | 9/1979 | Yuey | G21C 17/116 |
| | | | | 174/151 |
| 4,235,674 A | * | 11/1980 | Yue | G21C 17/116 |
| | | | | 376/203 |
| 4,394,022 A | | 7/1983 | Gilmore | |
| 4,420,456 A | * | 12/1983 | Nickel | G21C 17/116 |
| | | | | 376/463 |
| 9,373,945 B2 | * | 6/2016 | Bernauer | G21C 13/036 |
| 9,413,152 B2 | * | 8/2016 | Fritz | G21C 13/06 |
| 9,991,009 B2 | * | 6/2018 | Berthold | G21C 17/116 |
| 10,910,118 B2 | * | 2/2021 | Brun | G21C 17/116 |
| 2013/0287157 A1 | * | 10/2013 | Conway | G21C 17/116 |
| | | | | 376/203 |
| 2013/0301777 A1 | * | 11/2013 | Berthold | G21C 17/116 |
| | | | | 376/228 |
| 2014/0198891 A1 | * | 7/2014 | Harkness | G21C 5/10 |
| | | | | 376/268 |
| 2015/0083487 A1 | * | 3/2015 | Leedecke | H01B 17/305 |
| | | | | 174/659 |
| 2017/0062081 A1 | * | 3/2017 | Mustafin | G21C 13/04 |
| 2021/0210234 A1 | * | 7/2021 | Brun | G21C 13/036 |

FOREIGN PATENT DOCUMENTS

| | | | | |
|---|---|---|---|---|
| GB | 1488174 A | | 10/1977 | |
| JP | 57-097298 | | 5/1982 | |
| JP | 58-080736 | | 5/1983 | |
| JP | 01073296 A | | 3/1989 | |
| JP | S6473296 A | * | 3/1989 | G21C 13/10 |
| JP | 2014085242 A | * | 5/2014 | |

OTHER PUBLICATIONS

International Preliminary Report on Patentability and the Written Opinion of the International Searching Authority as issued in International Patent Application No. PCT/EP2016/074704, dated May 22, 2018.

* cited by examiner

VESSEL ELECTRICAL PENETRATION ASSEMBLY FOR A NUCLEAR REACTOR

CROSS-REFERENCE TO RELATED APPLICATIONS

This application is a divisional of U.S. application Ser. No. 15/777,561, filed May 18, 2018, which is the U.S. National Stage of PCT/EP2016/074704, filed Oct. 14, 2016, which in turn claims priority to French Application No. 1561112, filed Nov. 19, 2015, the entire contents of all applications are incorporated herein by reference in their entireties.

TECHNICAL FIELD OF THE INVENTION

The invention relates to the field of vessel electrical penetration assemblies (V-EPA) passing through nuclear reactor vessels.

The invention finds particularly interesting application in the field of integrated nuclear reactors and Small & Modular Reactors (SMR) comprising numerous in-vessel actuators/sensors creating specific electrical penetration needs. An application in conventional pressurised reactors is possible.

PRIOR ART

For an application in an SMR using in-vessel actuators, these vessel electrical penetrations have to meet several criteria. They must be able to be dismantled rapidly, be supple in order to be compatible with differential expansions between the vessel and the internals, have a significant useful diameter (diameter typically 30 to 50 mm) in order to be compatible with the number and the power of the electrical connections to ensure for the actuators in the vessel.

In the field of pressurised water reactors, the solutions adopted for instrumentation connections are conventionally:
    thimbles positioned through the vessel of the reactor. The thimbles then have to constitute an extension of the second regulatory containment barrier and are consequently greatly over-dimensioned, robust, rigid, slightly or difficult to dismantle, and have a restricted diameter to limit the leakage rate in the event of an accident;
    mechanical connections of "Swagelock®" type connected onto through tubes of small diameter receiving for example thermocouples, the whole constituting an extension of the second containment barrier.

However, these solutions are not very transposable directly to the SMR field because, in practice, they do not meet the connection needs of a vessel actuator of an SMR. In fact the very principle of the thimble does not able dismantleability at the level of the actuator, these solutions are not very flexible, and have a useful diameter limited to a typical value below 15 mm.

To meet the needs of an SMR, an approach consists in putting in place an extension of the second barrier within the vessel up to each sensor/actuator for all of the electrical penetrations of an SMR. Illustrations of this approach in the particular case of an SMR are notably described in the documents US 20130287157 and US 2014198891. These documents describe the putting in place within the vessel of an instrumentation flange dedicated to electrical penetrations which can be dismantled and which groups together a plurality of thimbles required for the specific needs of an SMR. The dedicated flange thus makes it possible to take down in a single operation all of the electrical penetrations. This approach only partially responds to the problem posed. On the one hand, it may be considered disadvantageous for the overall design of the reactor to add a dismantleable vessel flange with the associated risk of leakage on this large diameter leaktight assembly. On the other hand, the large number of electrical connections required by the putting in place of in-vessel actuators is going to lead to adopting either a very large number of thimbles of limited diameter, or thimbles of significantly larger diameter than those employed to date, said thimbles being dismantleable at the level of the actuators. In each of these alternatives, this is going to complicate the safety demonstration and put constraints on the regulatory inspection of said second barrier extension.

DESCRIPTION OF THE INVENTION

In this context, the invention aims to propose a vessel electrical penetration assembly for a nuclear reactor meeting the electrical connection needs of the numerous actuators of an SMR and making it possible to respect the spirit of the design regulations imposed in the field of pressurised reactors and SMR in particular, namely the prevention of primary leakages and the limitation of the consequences of potential failures.

To this end, the subject matter of the invention is a vessel electrical penetration assembly capable of being installed in a penetration of a vessel of a nuclear reactor, said electrical penetration assembly being characterised in that it comprises:
    a docking tube capable of forming an extension of the second containment barrier of the nuclear reactor, said docking tube comprising:
    a first end capable of being positioned inside the vessel and capable of being connected mechanically and in a leaktight manner with an abuttal (actuator or sensor) inside said vessel;
    a second end capable of being made integral mechanically and in a leaktight manner with the vessel;
    a leaktight electrical bar passing through said docking tube and having on either side leaktight connectors ensuring an electrical connection between said abuttal and the outside of said reactor; said leaktight electrical bar having means for limiting leakage of primary liquid outside of the vessel in the event of failure of said second containment barrier extension;
    mechanical maintaining means for making said electrical bar integral with said vessel, at the required pressure conditions.

The electrical penetration assembly according to the invention may also have one or more of the characteristics below taken individually or according to any technically possible combinations thereof:
    the electrical bar comprises an outer envelope having a peripheral protrusion of which the external size is dimensioned so as to minimise the space between the docking tube and the electrical bar, the peripheral protrusion forming said means for limiting the rate of leakage of primary liquid between the docking tube and the electrical bar in the event of failure of said second containment barrier extension;
    the peripheral protrusion is positioned so as to limit the rate of leakage of primary liquid at the level of the penetration of the vessel;
    the means for limiting leakage of primary liquid outside of the vessel in the event of failure of said second containment barrier extension are formed by a sealing means arranged between the vessel and the electrical bar and by a means of detecting the increase in pressure inside the docking tube;

the docking tube has an internal diameter greater than 30 mm;

said leaktight connectors of the electrical bar have an insulator made of ceramic or an insulator made of pre-stressed vitroceramic;

the docking tube comprises at least one rigid part and one flexible part capable of deforming at least along one direction;

said docking tube is made integral mechanically and in a leaktight manner with the outside of said vessel;

said docking tube is made integral mechanically and in a leaktight manner with the inside of said vessel;

the docking tube can be dismantled;

the electrical bar comprises an outer envelope, the outer envelope having at least one rigid part and one flexible part capable of deforming at least along one direction.

The subject matter of the invention is also a nuclear reactor vessel characterised in that it comprises at least one electrical penetration assembly according to the invention.

The subject matter of the invention is also a nuclear reactor comprising a vessel according to the invention.

Advantageously, the nuclear reactor is an integrated reactor or a small modular reactor.

BRIEF DESCRIPTION OF THE FIGURES

Other characteristics and advantages of the invention will become clear on reading the description that follows, with reference to the appended figures.

The terms "upstream" and "downstream" used in the patent application are defined by considering the direction of flow of the primary fluid in the event of leakage, that is to say from the inside to the outside of the vessel 10.

DETAILED DESCRIPTION OF AN EMBODIMENT

Figure 1:
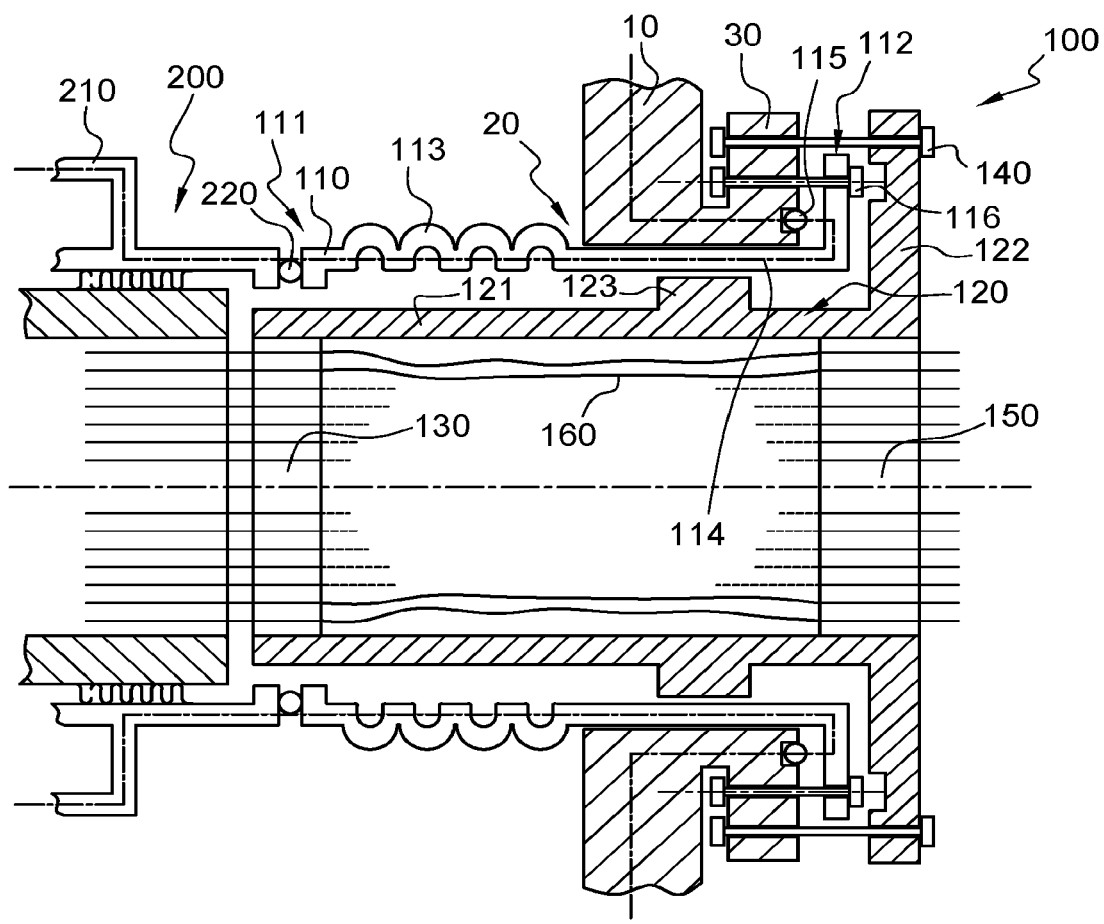
FIG. 1 illustrates a sectional view of a part of a vessel of a nuclear reactor showing a first embodiment of a vessel electrical penetration assembly according to the invention.

FIG. 1 illustrates a sectional view of a first exemplary embodiment of a vessel electrical penetration assembly (V-EPA) according to the invention installed in a penetration 20 of a vessel 10 of a nuclear reactor, of integrated or instead SMR type.

The vessel electrical penetration assembly 100 comprises a docking tube 110. The docking tube 110 has a first end 111, called inner end, intended to be positioned inside the vessel 10 of the nuclear reactor and connected mechanically and in a leaktight manner to the outer envelope 210 of the abuttal (actuator or sensor) 200 positioned inside the vessel 10, and a second end 112, called outer end, intended to be made integral in a leaktight manner with the vessel 10 of the reactor.

Figure 3:
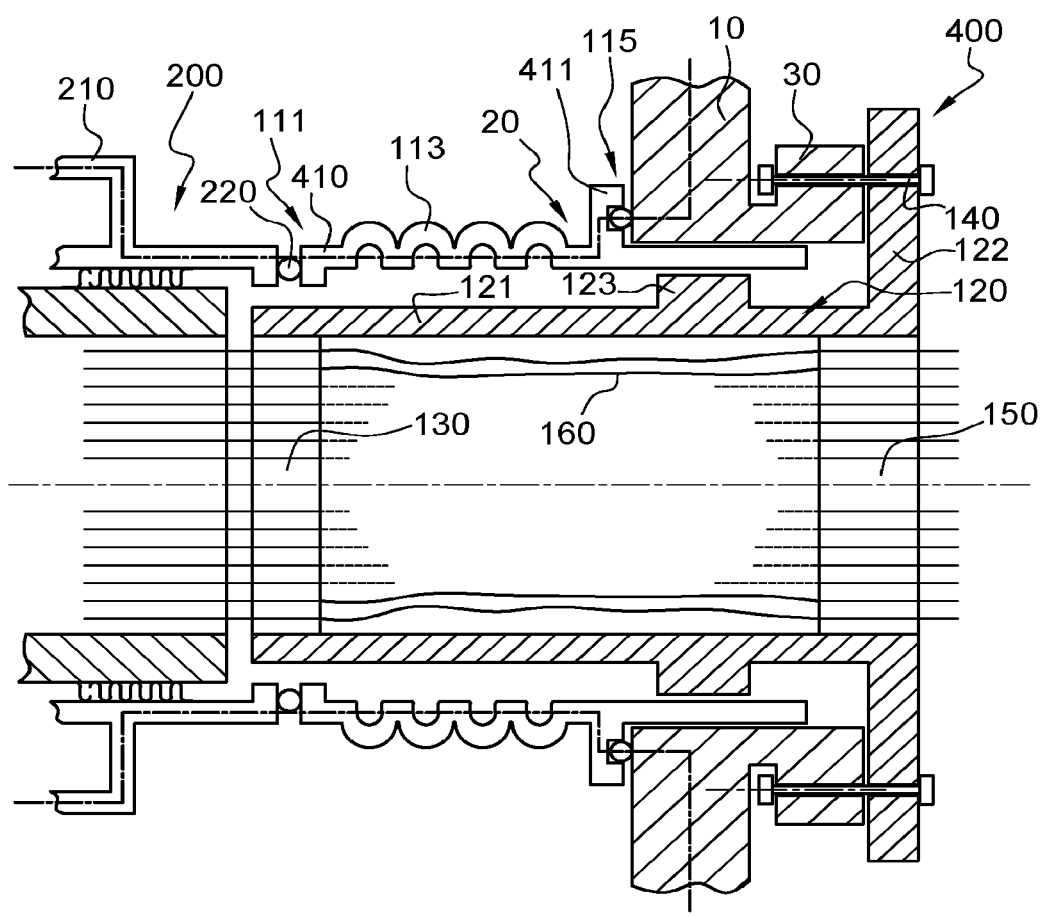
FIG. 3 illustrates a sectional view of a part of a vessel of a nuclear reactor showing a third embodiment of a vessel electrical penetration assembly according to the invention.

In the first exemplary embodiment illustrated in FIG. 1, the docking tube 110 is inserted via the outside of the vessel 10. To this end, the outer end 112 of the docking tube forms a maintaining flange capable of being made integral mechanically via maintaining means 116 on a vessel sleeve 30 as illustrated in FIG. 1. Obviously, other implementations are possible such as for example via the inside of the vessel as illustrated in FIG. 3, of which the embodiment will be detailed hereafter.

Obviously, ad-hoc sealing means 115 are provided between the vessel sleeve 30 and the docking tube 110, and more particularly between the outer end 112 of the docking tube 110, making it possible to realise a sealing between the vessel 10 and the docking tube 110 during its mounting.

The docking tube 110 advantageously has a flexible part 113 thus allowing a certain flexibility (for example in the longitudinal direction of the penetration 20) of the docking tube 110 inside the vessel 10 of the nuclear reactor, making it possible notably to compensate differential expansions of the different parts of the mounting.

The docking tube 110 is dimensioned so as to be certified to withstand the temperature and pressure conditions of the primary liquid. The mechanical linkage 220 between the docking tube 110 and the outer envelope 210 of the actuator 200 is also a linkage making it possible to withstand the conditions of the primary liquid. As an example, this mechanical linkage 220 may be realised by a reverse flange mounting tightened via the inside of the docking tube 110 onto a metal joint.

The outer envelope 210 of the actuator 200 is also designed and certified to be leaktight at the temperature and pressure conditions of the primary liquid.

The docking tube 110 has a significant useful diameter, typically greater than 30 mm enabling the passage of an electrical connection constituted of 10 to 20 contact points of which power contacts for the actuators.

The docking tube 110 is thus comparable to an extension of the second containment barrier of the nuclear reactor (represented in dotted lines in FIG. 1), which can be dismantled, flexible and which has a significant diameter for the passage of numerous electrical connections. Nevertheless, given the significant diameter of this docking tube 110, the unique use of this docking tube 110 would not be acceptable in a safety analysis while taking account of the probabilities of failure and the consequences of resulting breaches. In fact, in the event of sealing failure of the docking tube 110 or instead the mechanical linkage 220 between the actuator 200 and the docking tube 110, the rate of leakage of primary liquid would be very important and disadvantageous in the safety analysis.

For this reason, the vessel electrical penetration assembly 100 also comprises at its centre an electrical bar 120 extending inside the docking tube 110. The electrical bar 120 can advantageously be dismantled from the docking tube 110 via the outside of the vessel 10.

The function of the electrical bar 120 is to ensure electrical continuity between the actuator 200 and a cable (not represented) situated outside of the vessel 10. The electrical bar 120 comprises an outer envelope 121 forming a tube, for example made of stainless steel, containing a plurality of electrical cables 160 ensuring the electrical connection on either side of the electrical bar 120 and more precisely between a first leaktight connector 130 and a second leaktight connector 150 positioned at the level of the ends of the electrical bar 120. The electrical cables 160 inside the electrical bar 120 are thus made non-dismantleable. The electrical cables 160 are for example mineral cables certified at the temperature conditions of the primary liquid.

The leaktight connectors 130, 150 are made integral, for example by means of leaktight welds, at the level of the ends of the electrical bar 120. Thus, the electrical bar 120 has a longitudinal sealing at the pressure and temperature conditions of the primary liquid.

The diameter of the connectors 130, 150 and the number of pins constituting them are set by the functional need (i.e. as a function of the number of necessary wires and insulation). The leaktight connectors 130, 150 thus used in an integrated nuclear reactor typically have a diameter between 30 mm and 50 mm.

The leaktight connectors 130 and 150 are electrical connectors using ceramic technology or pre-stressed vitroceramic technology to ensure sealing on either side of the electrical bar 120. The leaktight connectors 130, 150 are connectors certified to withstand the conditions of the primary liquid, but they are not subject to the regulations applicable to devices of the second containment barrier because thanks to the vessel electrical penetration assembly 100 according to the invention, they do not participate in the realisation of this second containment barrier and are only called upon in the event of failure of the extension (110 and/or 220 and/or 210).

Apart from the electrical function, the electrical bar 120 also has the function of filling the inner space of the docking tube 110 and thereby limiting the rate of leakage of primary liquid in the event of potential failure of the sealing of the extension of the second containment barrier (represented by the dotted line in FIG. 1). In this first embodiment, the electrical bar 120 is dimensioned such that its external size enables a mounting in the docking tube 110 while minimising the residual space between the outer envelope 121 of the electrical bar 120 and the docking tube 110. As an example, the electrical bar 120 comprises on its outer envelope 121 a peripheral boss 123 the function of which is to allow a limited and controlled leakage path of the primary liquid in the event of potential failure of the sealing of the extension of the second containment barrier (represented by the dotted line in FIG. 1). The leakage path is thus limited to the annular section between the internal diameter of the docking tube 110 and the maximum external diameter of the electrical bar 120, here formed by the peripheral boss 123.

The peripheral boss 123 may be insulated on a part of the outer envelope 121 of the electrical bar 120 as represented in FIG. 1, but it is also provided to extend the peripheral boss over a large part of said outer envelope 121 or instead to provide a plurality of peripheral bosses 123 that can be spread out over the length of the outer envelope 121 located inside the docking tube 110. Advantageously, the docking tube 110 has at least one peripheral boss 123 at the level of the penetration 20 of the vessel 10.

The different components of the electrical bar 120 described previously are assembled in an indissociable manner (for example by welding) to constitute a single-piece electrical bar and which can be dismantled independently of the docking tube 110.

The electrical bar 120 comprises, at the level of the outer end of the outer envelope 121, an annular ferrule 122 thereby forming a maintaining flange making it possible to make integral the electrical bar 120 by the outside of the vessel 10 via maintaining means 140 ensuring its mechanical maintaining. Advantageously, the mechanical maintaining means 140 are formed by the cooperation of nuts and bolts withstanding the required pressure conditions, thereby forming an anti-ejection device of the electrical bar 120 in the event of leakage of the second barrier extension.

The mechanical maintaining means 116 making the docking tube 110 mechanically integral on the vessel 10 are also formed by the cooperation of nuts and bolts.

According to an alternative embodiment, not represented, it is possible to make the docking tube 110 as well as the electrical bar 120 mechanically integral with common mechanical maintaining means. In this alternative embodiment, the body of the screw of the maintaining means advantageously passes through at one and the same time the annular ferrule 122 of the electrical bar 120, the outer end 112 of the docking tube 110, and the vessel sleeve 30.

The electrical penetration assembly 100 thus described makes it possible to meet the functional needs of an electrical penetration assembly of an integrated reactor while meeting nuclear safety and safety analysis criteria. With the electrical penetration assembly 100 according to the invention, in the event of failure of the extension of the second containment barrier represented by the dotted line in the figures, the second line of defence of the electrical penetration assembly 100 is formed by the inner electrical bar 120 and the leaktight connectors 130, 150 which withstand the conditions of the primary liquid as well as by the limiter of the potential leakage rate formed by the peripheral boss 123 of the outer envelope 121 which makes it possible to minimise and to control the potential rate of leakage of primary liquid.

Such an architecture thus makes it possible to have leaktight connectors 130, 150 withstanding the conditions of the primary liquid (i.e. the temperature and pressure conditions of the primary liquid) without nevertheless responding to the regulations for the design, manufacture and periodic inspection of the elements constituting the second containment barrier, which makes it possible to use advantageously a leaktight connector of simple design, easy to connect and/or to disconnect, and to avoid a periodic inspection of the leaktight connectors 130, 150.

In fact, the continuity of the second containment barrier is ensured by the envelope 210 of the actuator 200 as well as by the docking tube 110 of the electrical penetration assembly 100.

Advantageously, the materials used to realise the sealing of the leaktight connectors 130, 150 are different. Thus, for example, it is possible to use an insulating connector 130 with ceramic technology and an insulating connector 150 using pre-stressed vitroceramic technology.

Figure 2:
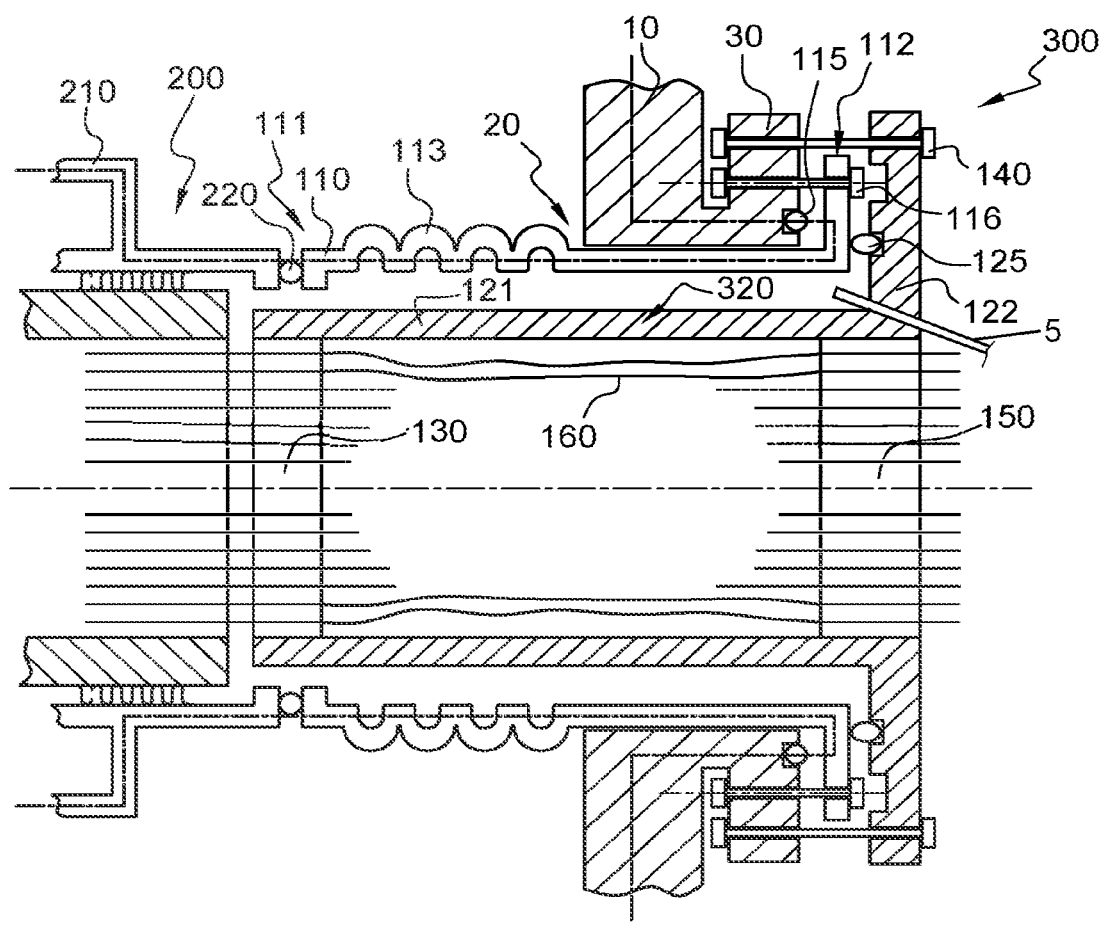
FIG. 2 illustrates a sectional view of a part of a vessel of a nuclear reactor showing a second embodiment of a vessel electrical penetration assembly according to the invention.

FIG. 2 illustrates a sectional view of a part of a vessel of a nuclear reactor showing a second embodiment of a vessel electrical penetration assembly 300 according to the invention. This second embodiment is identical to the first embodiment described previously with the exception of the elements which will be described in the following paragraphs.

In this second embodiment, the peripheral boss 123 acting as limiter of the rate of leakage of primary liquid inside the docking tube 110 is replaced by the putting in place on the one hand of a sealing means 125 realising a sealing between the electrical bar 320 and the vessel (or the docking tube 110), and on the other hand a leakage detection cell (not represented), typically formed by a pressure detector 5 inside the docking tube 110. The pressure detector 5 inside the docking tube is thus capable of detecting a sealing failure of the actuator and/or of the leaktight linkage 220 between the actuator 200 and the electrical penetration assembly and/or the electrical penetration assembly 300 itself. This arrangement corresponds to an in-depth defense approach on potential leakages of the V-EPA, for which the second barrier extension 110 is a first monitored sealing line, the sealing means 125 is a second sealing line called upon in the event of failure of the first.

Finally, according to an alternative embodiment, it is also possible to integrate the two architectural arrangements described previously in the two preceding embodiments to limit and more fully control the leakage of primary liquid in the event of failure of the second barrier extension. Thus, the combination of these arrangements makes it possible to have a second barrier extension formed by the docking tube 110 forming a first monitored sealing line, a sealing means 125 forming a second sealing line called upon in the event of failure of the first and finally a leakage limiter 123 constituting a final line of limitation of the consequences of the failure of the first two lines.

FIG. 3 illustrates a sectional view of a part of a vessel of a nuclear reactor showing a third embodiment of a vessel electrical penetration assembly 400 according to the invention. This third exemplary embodiment is identical to the first embodiment described previously in FIG. 1 with the exception of the elements which will be described in the following paragraphs.

In this third embodiment, the vessel electrical penetration assembly 400 comprises a docking tube 410 inserted via the inside of the vessel 10. The docking tube 410 comprises a ferrule 411 capable of being made integral mechanically via maintaining means (not represented) with the inside of the vessel 10. Ad-hoc sealing means 115 are also provided between the inner wall of the vessel 10 and the docking tube 110, and more particularly the ferrule 411, making it possible to realise a sealing between the vessel 10 and the docking tube 110 during its mounting. The mechanical maintaining means and the sealing means are formed for example by a weld, by welding of the ferrule 411 on the inner wall of the vessel 10.

This third embodiment has been illustrated as an example with a peripheral boss 123 at the level of the electrical bar 120 as described previously in FIG. 1. Nevertheless, this mounting of the docking tube 410 via the inside of the vessel 10 can also be realised with the embodiment of the electrical bar 320 described in FIG. 2.

According to another embodiment of the invention (not represented), it is provided that the electrical bar 120, 320 or at least the outer envelope 121 has a flexible part in an identical manner to the docking tube 110, 410 thus allowing a certain flexibility of the electrical bar 120, and thus of the electrical penetration assembly 100, 300, 400 as a whole, inside the vessel 10 of the nuclear reactor.

The invention claimed is:

1. A vessel electrical penetration assembly capable of being installed in a penetration of a vessel of a nuclear reactor, said electrical penetration assembly comprising:
a docking tube capable of forming an extension of a second containment barrier of the nuclear reactor, said docking tube comprising:
a first end capable of being positioned inside the vessel and capable of being connected mechanically and in a leaktight manner to an abuttal inside said vessel;
a second end capable of being made integral mechanically and in a leaktight manner with the vessel;
a leaktight electrical bar passing through said docking tube and having on either side leaktight connectors ensuring an electrical connection between said abuttal and the outside of said reactor; said leaktight electrical bar including sealing means comprising a first sealing means and a second sealing means for avoiding leakage of primary liquid outside of the vessel in the event of failure of said second containment barrier extension;
mechanical maintaining means for making said electrical bar integral with said vessel, at the required pressure conditions;
wherein the vessel is sealed with respect to the docking tube by way of the first sealing means being arranged between the docking tube and the electrical bar and the second sealing means being arranged between the electrical bar and the vessel, wherein a pressure detector to detect an increase in pressure is located inside the docking tube, and wherein the vessel and the electrical bar are directly connected via the mechanical maintaining means.

2. The vessel electrical penetration assembly for a nuclear reactor according to claim 1, wherein said docking tube is made integral mechanically and in a leaktight manner with the outside of said vessel.

3. A nuclear reactor vessel comprising at least one electrical penetration assembly according to claim 1.

4. A nuclear reactor comprising a nuclear vessel according to claim 3.

5. The nuclear reactor according to claim 4, wherein said nuclear reactor is an integrated reactor or a small modular reactor.

6. The vessel electrical penetration assembly for a nuclear reactor according to claim 1, wherein the mechanical maintaining means is provided outside of the docking tube.

7. The vessel electrical penetration assembly for a nuclear reactor according to claim 1, wherein a second mechanical maintaining means is provided to connect the second end of the docking tube and the vessel.

* * * * *